(12) United States Patent
Bohrer et al.

(10) Patent No.: US 6,397,570 B1
(45) Date of Patent: Jun. 4, 2002

(54) STOPPING DEVICE FOR A CROP TRANSPORT MECHANISM

(75) Inventors: Stefan Bohrer, St. Wendel; Jörg Weissig, Saarbrücken, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/651,180

(22) Filed: Aug. 30, 2000

(51) Int. Cl.$^7$ .......................... A01D 75/18; A01F 12/16
(52) U.S. Cl. ........................................ 56/10.2 J; 460/2
(58) Field of Search .............................. 56/16.6, 10.2 J, 56/10.2 R, 51, 52, 60, 71, 500, 504, 505, 156, 198; 460/2, 3; 241/33, 34; 340/684

(56) References Cited

U.S. PATENT DOCUMENTS

| | | | |
|---|---|---|---|
| 3,959,953 A | * 6/1976 | Garrott | 56/10.2 J |
| 4,296,591 A | 10/1981 | Martenas et al. | |
| 4,639,666 A | * 1/1987 | Stosser et al. | 324/202 |
| 4,805,385 A | * 2/1989 | Bohman et al. | 56/10.2 J |
| 4,854,113 A | * 8/1989 | Strosser et al. | 56/10.2 J |
| 5,921,071 A | * 7/1999 | Paquet et al. | 56/16.6 |
| 6,105,347 A | * 8/2000 | Behnke | 56/10.2 J |

FOREIGN PATENT DOCUMENTS

| | | |
|---|---|---|
| DE | 197 42 060 | 3/1999 |
| EP | 0 821 871 | 2/1998 |
| SU | 1556575 | 3/1988 |

* cited by examiner

Primary Examiner—Robert E. Pezzuto

(57) ABSTRACT

A crop harvesting machine includes a crop transport or feed mechanism including a feed roller to which a toothed wheel is fixed. A detent in the form of a pivotally mounted lever carries a cam or tooth, the detent being pivotable between a first position wherein the cam is engaged with the toothed wheel so as to block rotation of the feed roller, and a second position wherein the cam is disengaged from the toothed wheel so as to permit free rotation of the crop feed roller. A one-way hydraulic cylinder is coupled to the detent in parallel with a tension coil spring and is controlled by a solenoid control valve, coupled in a control circuit forming part of a metal detector circuit, so as to be pressurized for moving the detent to its first, blocking position when the metal detector sensor senses an undesirable metal object in the crop, and so as to be coupled to sump so that the spring moves the detent to its second position, permitting rotation of the crop feel roller, when no metal is detected.

1 Claim, 2 Drawing Sheets ic objects, that have entered the chopper, If such
STOPPING DEVICE FOR A CROP TRANSPORT MECHANISM The invention concerns a stopping device for a crop transport or feed mechanism of a harvesting machine with a movable detent, which is set up to assume a first position in which the crop transport mechanism is stopped and a second position in which the crop transport mechanism is movable, and with a device to move the detent.

BACKGROUND OF THE INVENTION

In the prior art, forage choppers were equipped with metal detectors set up to detect undesired metal objects, especially ferromagnetic objects, that have entered the chopper, If such an object is detected, a detent is triggered by a control which stops a draw-in roller and engages a connected out-of-round element to rotate in unison with it especially a cam. At the same time the drive of the draw-in roller is disengaged. The detent is brought from a blocking position, hereafter called the first position, against the action of a spring, to a second position in which the draw-in roller is rotatable by a control connected to the metal detector by means of an electromagnetic drive, generally an electromagnet. This type of forage chopper is known, for example, from EP 0 324 253 A and DE 2 552 805 A.

The electromagnetic drive in the known forage choppers is always activated when a normal work operation occurs, and the detent is therefore in the second position. In order to achieve the situation by which the draw-in roller is stopped sufficiently quickly after detection of a metal object, a correspondingly strong spring must be used that brings the detent back to the first position quickly enough after disengagement of the electromagnetic drive. The electromagnet must be sufficiently large in dimension to overcome the force of the spring, and this feature loads the electrical system of the harvesting machine quite severely because of the relatively high current necessary for its operation. Nevertheless, it is problematical whether a sufficiently short time interval for stopping the draw-in roller is achievable. Moreover, because of the quite limited holding force of the electromagnet caused by the relatively high current demand, the detent can fall onto the cam, especially when the harvesting machine passes over a ground depression, and thus cause an unintentional stop of the draw-in roller. This incorrect function is called false tripping.

A protective system for an agricultural harvesting machine is proposed in U.S. Pat. No. 3,805,497 in which a detector for obstacles controls a valve by which a hydraulic cylinder can be charged with pressurized fluid. The hydraulic cylinder lifts the draw-in devices of the harvesting machine if an obstacle is detected in order to protect them from damage.

The problem underlying this invention, in addition to the problem of false tripping and the relatively high current demand of the known devices for stopping crop transport mechanisms of a harvesting machine, is seen in the fact that the disconnection times are not always sufficient to protect the chopping drum from damage.

SUMMARY OF THE INVENTION

According to the present invention there is provided an improved stopping device for the crop feed of a forage harvester.

An object of the invention is to provide a stopping device for the crop feed of a crop harvester which reliably functions only in response to a metal detector signal.

A further object of the invention is to provide a stopping device for the crop feed of a crop harvester which operates such that the stopping device acts to block crop feed operation when there is a loss of power for energizing a control of the stopping device.

A more specific object of the invention is to provide a stopping device, as set forth in one of the previous objects, wherein a detent for engaging a toothed wheel coupled to a rotary crop feed element is controlled by a one-way hydraulic cylinder and a coil tension spring coupled in parallel with the cylinder and such that, when pressurized, the hydraulic cylinder acts to engage the detent with the toothed wheel, and when the hydraulic cylinder is coupled to sump, the spring moves the detent out of contact with the toothed wheel.

These and other objects of the invention will become apparent from a reading of the ensuing description together with the appended drawings.

DESCRIPTION OF THE PREFERRED EMBODIMENT

Figure 1:
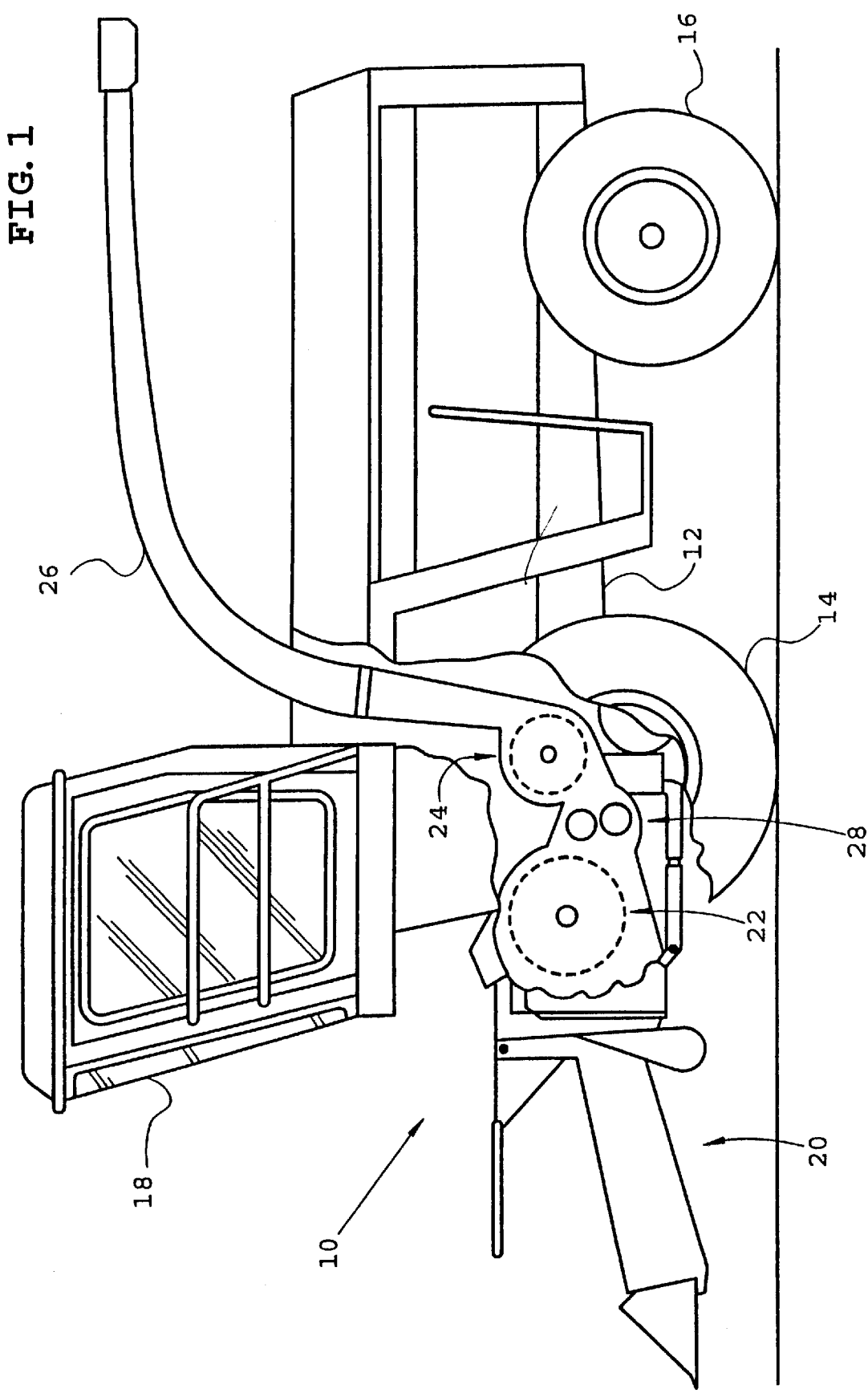
FIG. 1 is a somewhat schematic, left side elevational view of a harvesting machine.

The harvesting machine 10, shown in FIG. 1, is in the form of a self-propelled forage chopper including a frame 12 which is carried on front and rear pairs of wheels 14 and 16. Operation of the harvesting machine 10 occurs from a driver's cab 18 from which a crop pick-up device 20, which is mounted to the front of the frame 12, can be observed. A crop picked up from the ground by means of the crop pick-up device 20, for example, corn, grass, or the like, is fed to a chopping drum 22 which chops it into small pieces and releases it to a conveyor device 24. The crop leaves the harvesting machine 10 via a discharge chute 26, which is mounted for pivoting about an upright axis, to a trailer being towed next to it. Between the chopping drum 22 and conveyor device 24, a final grinding device 28 extends through which the crop being conveyed is fed tangentially to the conveyor device 24. The position of the final grinding device 28, however, is not critical so that it can also be provided downstream of the conveyor device 24.

Figure 2:
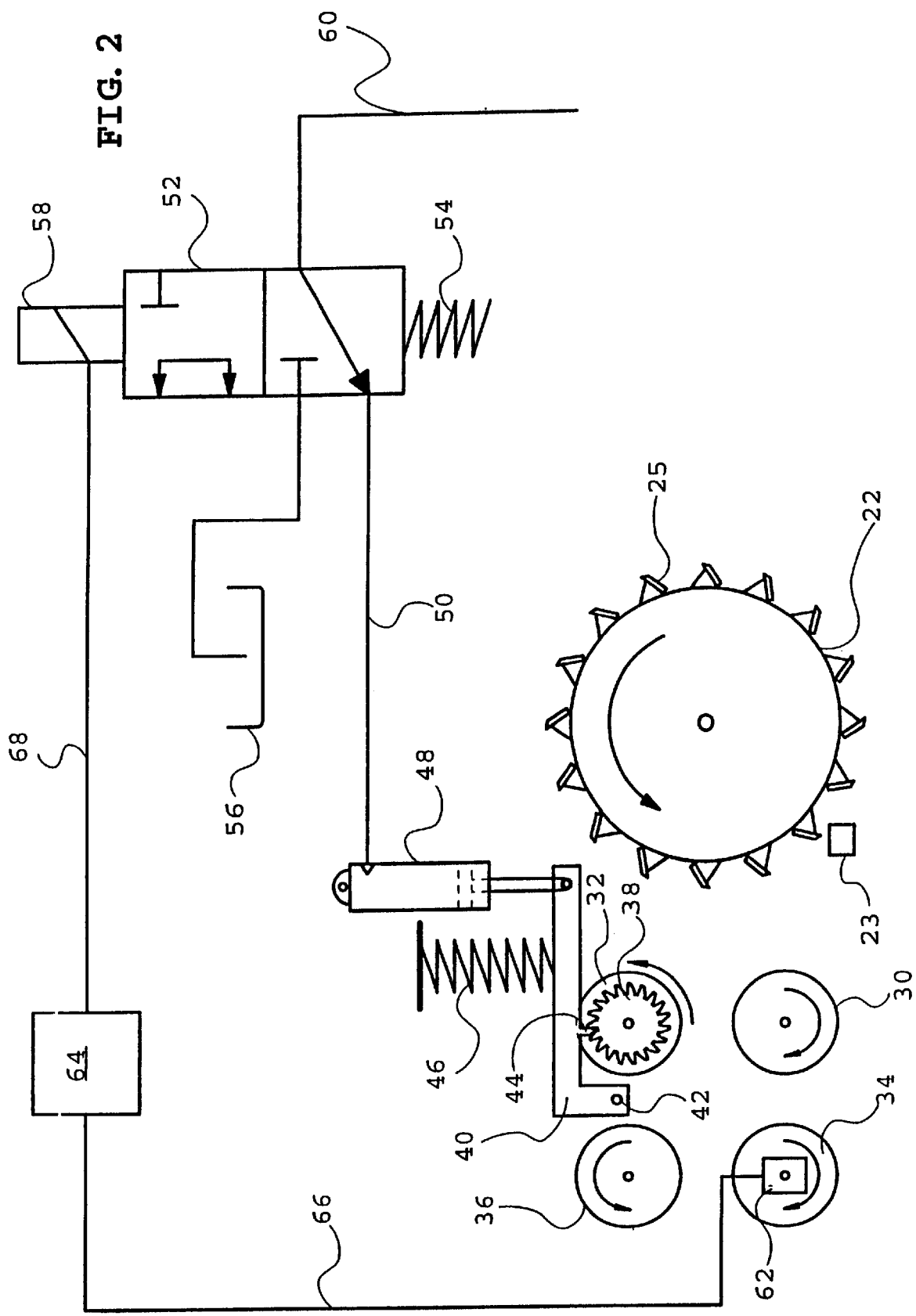
FIG. 2 shows a schematic side view, including an electrohydraulic control circuit, of a draw-in and chopping device of the harvesting machine of FIG. 1.

Referring now also to FIG. 2, there is shown the crop draw-in or feed device for providing crop to the chopping device 22 of harvesting machine 10. The draw-in device is arranged between the crop pick-up device 20 and chopping device 22 with respect to the stream of picked up crop. In its basic design, the draw-in device consists of a pair of front, lower and upper draw-in rollers 34 and 36, respectively, and a pair of rear, lower and upper draw-in rollers 30 and 32, respectively. The lower and upper rollers of each pair cooperate with each other in order to transport the crop from the crop pick-up device 20 to the chopping device 22. For this purpose, corresponding drive devices are provided which rotate each of the draw-in rollers 30, 32, 34 and 36. The corresponding directions of rotation are indicated in FIG. 2 by arrows. The upper draw-in rollers 32 and 36 are generally arranged movable up and down relative to the lower draw-in rollers 30 and 34, and are spring loaded so as to resist upward movement. For reasons of clarity and since they are known per se, the bearings of the upper draw-in rollers 32 and 36 and the springs used to resist upward movement are not included in FIG. 2.

The chopping drum 22 is provided with blades 25 distributed over the periphery of a drum so as to cooperate with a shearbar 23 to chop crop as the crop is fed over the shearbar 23 while the drum 22 rotates in the direction indicated by the arrow.

In order to prevent the blades 25 of the chopping drum 22 from being damaged by ferromagnetic foreign objects contained in the crop, a metal detection device is provided. The metal protection device has a sensor 62 arranged within the lower front draw-in roller 34. This type of sensor is known, for example, from EP 0 324 253 A, DE 19912407, DE 2 552 805 A and the references mentioned therein. Sensor 62 is connected to a control 64 via an electrical line 66, the control 64 acting to control a device, described in detail below, to immediately stop the rear upper draw-in roller 32 in the event a (ferromagnetic) metal object, for example, a tin can, contained in the crop, is detected by the sensor 62. The metal object is therefore not transported to chopping drum 22 so that the latter is not damaged. At the same time with stopping of the rear upper draw-in roller 32, control 64 interrupts the drive of draw-in rollers 30, 32, 34, and 36, which preferably occurs by switching off an electrical coupling or clutch which is situated in the drive train between the draw-in rollers 30, 32, 34 and 36 and its drive device, generally the main engine of the harvesting machine 10 which drives the draw-in rollers 30, 32, 34 and 36 by corresponding drive elements like belts and/or gears. It would also be conceivable to switch off, via control 64, a separate electric or hydraulic motor that drives the draw-in rollers 30, 32, 34, and 36. It is to be understood that other crop harvesting machines could use the invention with advantage. For example, the blocking device of the invention could be applied to crop harvesting machines having other crop transporting elements, like the screw of a crop gatherer, or a slope conveyor, and/or threshing drum of a combine harvester.

The stopping device of the rear upper draw-in roller 32 includes a detent 40 which is mounted to rotate around a pivot 42 and is provided with a cam or dog 44. The cam 44 is set up to engage with a toothed wheel 38 arranged on the axis of rotation of the rear upper draw-in roller 32 and connected to rotate in unison with it. The pivot 42 is anchored on the frame 12 of the harvesting machine 10. If the detent 40 is in a first or blocking position, as shown in FIG. 2, the cam or dog 44 is engaged with the toothed wheel 38 so that the rear upper draw-in roller 32 cannot rotate. If the detent 40 is in a raised second or release position, the cam 44 is disengaged from the toothed wheel 38, the rear upper draw-in roller 32 can be rotated by the drive device connected to it. The position of detent 40 with cam 44 is controlled by a single-action hydraulic cylinder 48 and a spring 46. The spring 46 is arranged so that it brings the detent 40 into the second or release position as long as the hydraulic cylinder 48 is not charged with pressure. Of course, it is possible to use a two-way hydraulic cylinder in which case there would be no need for the spring 46.

The hydraulic cylinder 48 is connected to a two-position valve 52 via a first hydraulic fluid line 50. In the first position, depicted in FIG. 2, the first hydraulic fluid line 50 is connected to a second hydraulic fluid line 60 via the valve 52, line 60 being under operating pressure and connected directly or indirectly to a corresponding pressure vessel or hydraulic fluid pump, which may be a charging pump or the like. The hydraulic cylinder 48 is therefore under operating pressure and brings the detent 40 with cam 44 into the first or blocking position. In the second position of valve 52, the second hydraulic fluid line 60 is blocked and the first hydraulic fluid line 50 is connected to a reservoir 56. In the second position of the valve 52, pressure fluid is exhausted from the hydraulic cylinder 48 and the tension spring 46 brings the detent 40 with cam 44 into the second position so that the rear upper draw-in roller 32 can rotate.

The position of valve 52 is controlled by control 64 through a solenoid 58 which acts against the force of a spring 54. If the solenoid 58 is de-energized, the control spring 54 biases the valve 52 into the first position so that the detent 40 assumes its first position. If the solenoid 58 is energized with current through operation of the control 64, it moves the valve 52, against the bias of the spring 54, into the second position so that hydraulic cylinder 48 is connected to sump so that the spring 46 may collapse it and move the detent 40 to the second position. The control 64 is therefore set up to effect the stoppage of the rear upper draw-in roller 32 in response to the sensor 62 when the latter senses magnetic material. It is naturally also possible to stop any other draw-in roller 30, 34, 36 (or several of them) in addition to or as an alternative to the rear upper draw-in roller 32.

The hydraulic cylinder 48 is preferably of any known construction which results in its response time being relatively short. Also, the use of the hydraulic cylinder 48 to move the detent 40 has the advantage of the drive energy being from pressurized fluid whereby the electrical system of the harvesting machine 10 is not overloaded so that undesirable slow response time and/or false tripping does not occur. Moreover, the electrical circuit of the stopping device is configured so that during a failure of the electrical power supply, the detent 40 is automatically brought into its blocking position, since the valve 52 in the absence of current is brought into the first position by the solenoid 58 under the action of spring 54 in which hydraulic cylinder 48 is activated.

What is claimed is:

1. In a stopping device in combination with a crop transport mechanism of a harvesting machine wherein the transport mechanism includes a rotatable crop feed device, and said stopping device includes a toothed wheel coupled for rotation with said crop feed device and a moveable blocking element which is mounted for movement between a first position in which it engages said toothed wheel, whereby the crop transport mechanism is stopped and a second position in which it is disengaged from said toothed wheel such that the crop transport mechanism is movable, and a device to move the blocking element, the improvement, comprising: said device for movement of the blocking element includes a single-acting hydraulic cylinder coupled to said blocking element and being selectively pressurized for moving the blocking element to its first position; a two-position solenoid valve being coupled between said cylinder and a source of fluid pressure and a sump and being biased to a first position connecting said cylinder to said source of fluid pressure in an absence of an electrical control signal being connected to said solenoid valve, and being selectively shifted to a second position coupling said cylinder to said sump in response to receiving said control signal; resilient biasing element coupled to said blocking element for moving the latter to its second position whenever said cylinder is coupled to said sump; and a control system including a foreign object detector located for sensing a foreign object entrained in crop material located upstream from said crop feed device; said control system being coupled to said solenoid valve and operable for sending said control signal to said solenoid valve in an absence of a foreign object being detected by said foreign object detector and said foreign object detector being operable for effecting a condition in said control system for terminating said control signal to said solenoid valve in response to detecting a foreign object.

* * * * *